United States Patent [19]

Carbrey

[11] 3,745,253

[45] July 10, 1973

[54] TIME DIVISION SWITCHING SYSTEM

[75] Inventor: Robert Lawrence Carbrey, Boulder, Colo.

[73] Assignee: Bell Telephone Laboratories, Incorporated, Murray Hill, N.J.

[22] Filed: Feb. 9, 1972

[21] Appl. No.: 224,780

[52] U.S. Cl. .......................................... 179/15 AT

[51] Int. Cl. .......................................... H04j 3/00

[58] Field of Search .................. 179/15 AT, 15 AA, 179/15 AQ

[56] References Cited

UNITED STATES PATENTS 3,251,947 5/1966 Schlichte ........................ 179/15 AA

*Primary Examiner*—Ralph D. Blakeslee
*Attorney*—W. L. Keefauver

[57] ABSTRACT

A time division communication system wherein a plurality of time slots occurs in repetitive cycles includes a plurality of stations each having a circuit for selectively coupling the associated station to first, second and third common buses, and a network for transferring signals from a first selected station to a second selected station in a distinct time slot. Each coupling circuit is operative to store signal samples from one of the first and third common buses, couple the stored signal to the associated line, and selectively connect the associated station to the second common bus during a distinct time slot. The signal transfer network receives a signal sample from a selected first coupling circuit store via the first bus and a sample of the signal appearing on the selected first station output via the second bus, generates a signal corresponding to the difference between the applied signal samples and applies the generated signal to the second station coupling circuit via the third common bus.

11 Claims, 4 Drawing Figures

TIME DIVISION SWITCHING SYSTEM

BACKGROUND OF THE INVENTION

My invention relates to communication systems and, more particularly to signal transfer arrangements in a time division communication system.

Time division switching systems permit simultaneous exchange of information between selectively connected lines over a common communication link. Each information exchange between a pair of lines occurs in a selected recurring time slot of a repetitive group of time slots. During each repetitive time slot group, pairs of active lines are connected in sequence to the common link in preassigned time slots. In one such time slot, a channel is provided between a pair of selected lines. The information from each line assigned to the connection is sampled and the sampled information is exchanged over the common link. The common link is available to other connections during the remaining time slots of the repetitive cycle. As is well known in the art, the signal sampling rate for the lines may be selected to provide an accurate transfer of signals between each selectively connected pair.

In some prior art time division switching systems, a resonant transfer between line associated storage devices is utilized to accomplish an information exchange between a pair of lines in a distinct time slot. This type of transfer requires a relatively precise network for the information exchange which includes inductive elements and line associated storage capacitors selected for precisely timed signal exchanges. Since the energy exchange in each time slot is limited to a small portion thereof, a relatively large amount of power is needed for each exchange and only a small portion of the energy transferred lies within the desired information band. Thus, the electronic switches connecting the selected lines in a time slot must have very low losses and must be accurately timed. The conversion of the exchanged information to analog signals requires a complex filter associated with each storage device to permit maximum transfer of the limited energy in the desired band. In other time division signal transfer systems, a sampled signal from a storage device is transferred to a storage device wherefrom the stored sample is made available for an extended period of time. Such sample and hold arrangements provide a larger signal component in the desired band whereby the filter requirements are simplified and inductive elements are eliminated in the transfer network but the sample and hold technique has generally required at least two successive time intervals to complete the signal transfer between a pair of lines.

BRIEF SUMMARY OF THE INVENTION

My invention is a time division communication system serving a plurality of lines which includes at least first, second, and third common buses and a signal transfer network. Each line has an associated coupling circuit which operates to store signal samples from one of the first and third common buses, to couple the stored signal to the associated line, and to selectively connect the associated line to the second bus. During a distinct time slot, the signal transfer circuit is responsive to a signal sample from a selected first station coupling circuit storage means applied via the first common bus and a sample of the signal appearing at the output of the first line applied via the second common bus to produce a signal corresponding to the difference in the applied signal samples. A sample of the produced difference signal is applied to a selected second station coupling circuit storage means via the third common bus. In this manner, a signal transfer from a first selected line to a second selected line is accomplished in a single time interval and the transferred signal sample is made available to the second line for an extended period of time.

According to one aspect of the invention, a fourth common bus is added and each coupling circuit further includes apparatus to selectively connect the associated line to the fourth common bus. The signal transfer circuit includes one device responsive to a signal sample from a first station coupling circuit storing means applied via the first common bus and a sample of the signal appearing at the first line output applied via the second common bus to produce a signal corresponding to the difference in the applied first line signal samples. Another device is responsive to a signal sample from a second station coupling circuit storing means applied via the third common bus and a sample of the signal appearing at the second line output applied via the fourth common bus to produce a signal corresponding to the difference in the applied second line signal samples. A sample of the produced signal derived from the first line coupling circuit via the first and second common buses is applied to the second line coupling circuit storing means via the third common bus, and a sample of the produced signal derived from the second line coupling circuit is applied to the first circuit storing means via first common bus. In this manner, an exchange of samples between a pair of lines is accomplished in one time interval and each transferred signal is available to the destination line for an extended period of time.

DETAILED DESCRIPTION

Figure 1:
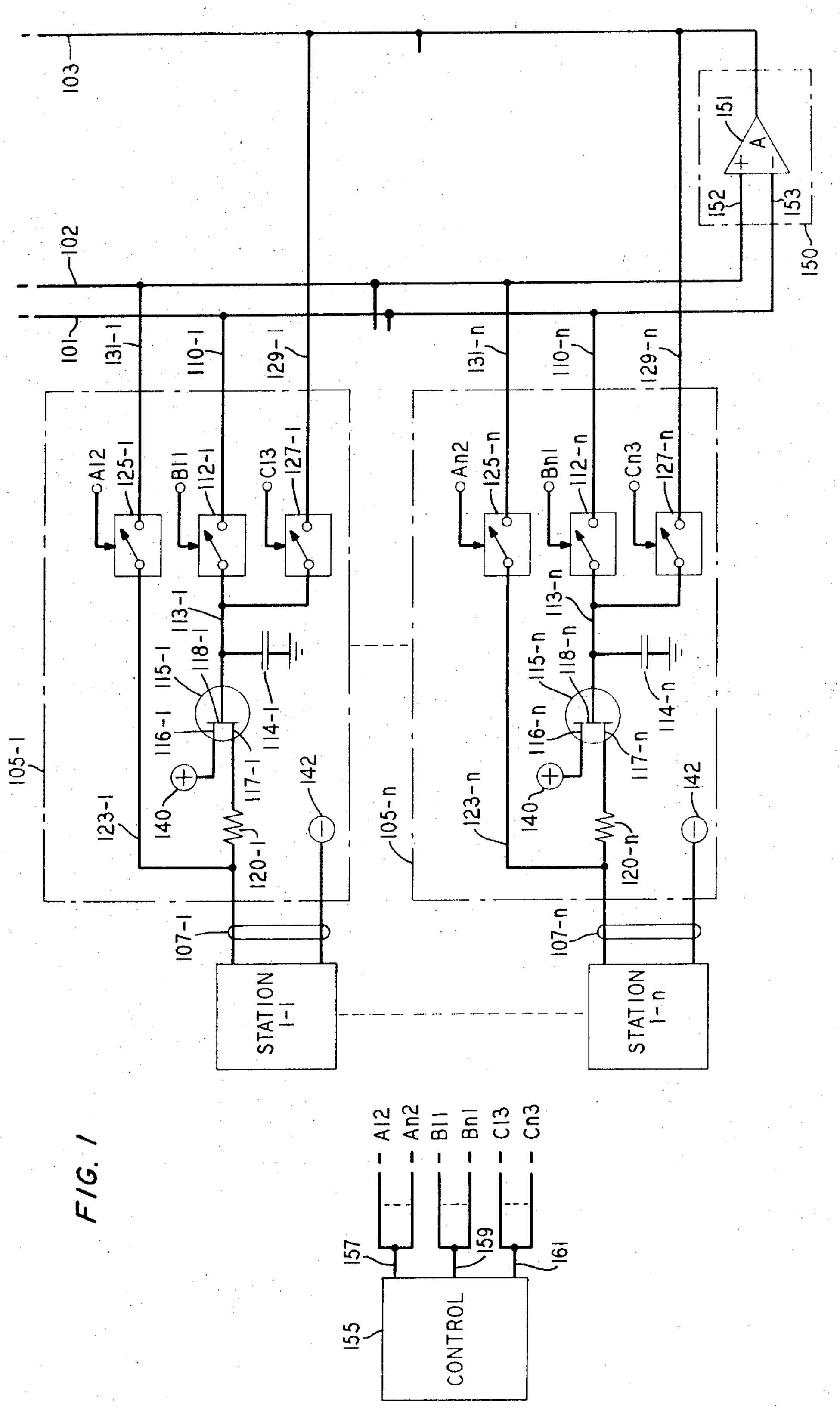
FIG. 1 depicts one embodiment of a time division communication system illustrative of my invention.

FIG. 1 shows a time division communication system including stations 1—1 through **1–*n*, coupling circuits 105–1 through 105–*n*, common buses 101, 102, and 103 and signal transfer network 150. Coupling circuit 105–1 is connected to station 1—1 via line 107–1 and is also connected to common buses 101, 102 and 103 via lines 110–1, 131–1 and 129–1, respectively. Similarly, coupling circuit 105–*n* is connected to station 1–*n* via line 107–*n* and is further connected to common buses 101, 102 and 103 via lines 110–*n*, 131–*n* and 129–*n*, respectively. Assume for purposes of illustration that station 1—1 is connected to station 1–*n* during time slot *ts*1 shown in FIG. 2 and that the signal from station 1—1 is applied to station 1–*n* via the time division arrangements of FIG. 1 during time slot *ts*1. At the beginning of time slot *ts*1, control 155 operates to provide control signal A12 on cable 157, B11 on cable 159, and C*n*3 on cable 161. These control signals are positive during time slot *ts*1. Control signal A12 closes switch 125–1 and control signal B11** closes switch 112–1 in coupling circuit 105–1, and control signal C*n*3 closes switch 127–*n* in coupling circuit 105–*n* during time slot *ts*1.

Figure 4:
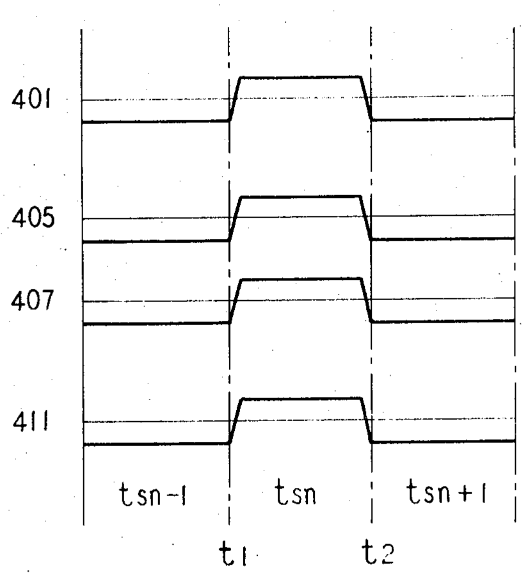
FIG. 4 shows waveforms useful in describing the embodiment depicted in FIG. 3.

In previous repetitive time slot cycles, capacitor 114–1 has received and stored signals applied thereto via line 129–1. The received stored signals on capacitor 114–1 are applied to insulated gate field effect transistor (IGFET) 115–1. The IGFETS shown in FIGS. 1 and 4 are *n* type well known in the art. It is to be understood the *p* type IGFETS and combinations of *n* type and *p* type IGFETS may also be used with appropriate modifications of control signals and bias arrangements. IGFET 115–1 is connected as a source follower amplifier and is biased in its linear range of operation by positive voltage source 140 connected to drain electrode 116–1 and negative voltage source 142 connected to source electrode 117–1 via the conductors of line 107–1, station 1—1, and impedance 120–1. As is well known in the art, a source follower operates to provide nearly unity voltage gain from its gate electrode to its source electrode while providing a very high impedance at its gate electrode and a relatively low impedance at its source electrode. It is to be understood, however, that other amplifying devices may be used in place of source follower 115–1. Gates 112–1, 125–1, 127–1, etc., may also advantageously compare IGFETs as disclosed in detail in the embodiment of FIG. 3.

The signal stored in capacitor 114–1 is transferred from gate electrode 118–1 to source electrode 117–1 with little attenuation. Impedance 120–1 is selected to match the characteristic impedance of line 107–1 to the combined impedance of impedance 120–1 and source follower 115–1 so that ideally one-half the signal voltage stored in capacitor 114–1 is applied to line 107–1 in accordance with well-known transmission network theory. It is to be understood, however, that impedance 120–1 may be chosen to provide a different signal level to line 107–1.

The signal voltage on capacitor 114–1 is applied to common bus 101 via lead 113–1, closed switch 112–1, and line 110–1. The signal at the junction between matching impedance 120–1 and line 107–1 includes both the signal outgoing from station 1—1 and the portion of the signal voltage on capacitor 114–1 which is coupled through source follower 115–1 and impedance 120–1. The signal at the junction is applied to common bus 102 via lead 123–1, closed switch 125–1 and line 131–1. Assume that the outgoing signal voltage from station 1—1 is *eo*1 and that the signal from capacitor 114–1 appearing at the junction between impedance 120–1 and line 107–1 is *eon*. In this event, the signal voltage applied to common bus 102 during time slot *ts*1 is *eo*1 + *eon* and the voltage applied to common bus 101 during time slot *ts*1 is 2*eon*.

Signal transfer network 150 includes amplifier 151. The signal voltage on common bus 102 is applied to input terminal 152 and the signal voltage on common bus 101 is applied to input terminal 153. Amplifier 151 may advantageously be an operational amplifier adapted to subtract the signal input on terminal 153, i.e., (2*eon*) from twice the signal input on terminal 152 i.e., 2(*eo*1 + *eon*). The output of amplifier 151 is then the signal voltage (2*eo*1 + 2*eon* − 2*eon*); and this signal voltage 2*eo*1 is applied to common bus 103 and therefrom to coupling circuit 105–*n* via line 129–*n*. Since switch 127–*n* is closed in response to positive control signal Cn3 during *ts*1, the signal voltage 2*eo*1 is applied to storage capacitor 114–*n* via lead 113–*n*. The signal voltage 2*eo*1 is also applied to gate electrode 118–*n* of IGFET source follower 115–*n* so that the signal voltage 2*eo*1 appears on source electrode 117–*n*. IGFET 115–*n* is biased in its linear range operation by positive voltage source 140 connected to drain electrode 116–*n* and negative voltage source 142 connected to source 117–*n* via the conductors of line 107–*n*, station 1–*n* and impedance 120–*n*. Matching impedance 120–*n* is selected to match the output impedance of source follower 115–*n* to the characteristic impedance of line 107–*n* whereby the signal voltage at the junction between resistor 120–*n* and line 107–*n* is *eo*1. In this way, the outgoing signal voltage *eo*1 from station 1—1 is transferred to station 1–*n*.

As is well known in the art, source follower amplifiers such as 115–1 and 115–*n* provide a gate to source d.c. voltage drop. Thus, the d.c. voltages applied to lines 107–1 and 107–*n* are offset from the voltages stored in storage capacitors 114–1 and 114–*n*. These offsets are compensated in the circuit of FIG. 1 by designing amplifier 151 to provide a corresponding d.c. voltage increase whereby the d.c. gain from one coupling circuit to the other coupling circuit is stabilized at a level consistent with station requirements.

Figure 2:
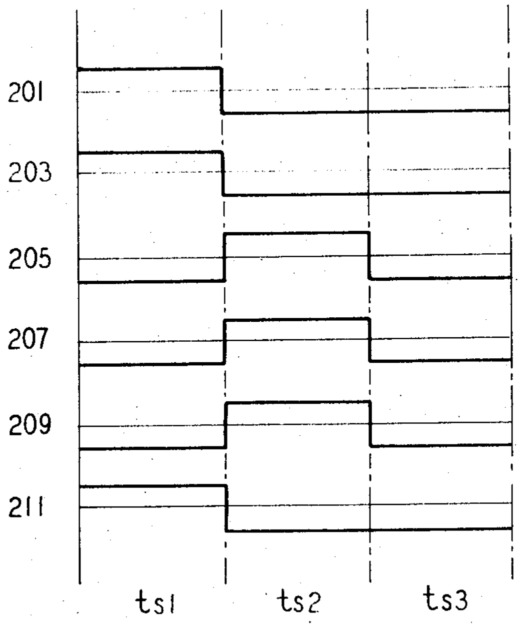
FIG. 2 shows waveforms useful in describing the embodiment depicted in FIG. 1.

In time slot *ts*2 shown in FIG. 2, control 155 is operative to produce positive control signals A*n*2, B*n*1 and C13. These control signals are applied to switches 125–*n*, 112–*n* and 127–1 via cables 157, 159 and 161 respectively. During time slot *ts*2, the signal at the junction between impedance 120–*n* and line 107–*n* is signal voltage *eo*1 derived from capacitor 114–*n* and signal voltage eon derived from the outgoing signal of station 1–*n*. The sum of these two signal voltages, *eo*1+*eon*, is applied to common bus 102 via closed switch 125–*n* and line 131–*n*. The signal voltage 2*eo*1 stored on storage capacitor 114–*n* is applied to common bus 101 via closed switch 112–*n* and line 110–*n*. As aforementioned with respect to the transfer in time slot *ts*1, the signals from common buses 102 and 101 are applied to amplifier 151 wherein the signal from common bus 101 is subtracted from twice the signal from common bus 102 so that the resultant output signal voltage is 2*eon*.

The amplifier output signal is applied to coupling circuit 105–1 via common bus 103 and line 129–1. Since switch 127–1 is closed during time slot *ts*2, the signal 2*eon* is applied to storage capacitor 114–1 and to gate 118–1 of IGFET 115–1. The signal voltage 2*eon* then appears at source electrode 117–1, and the signal voltage *eon* is applied to line 107–1 from matching impedance 120–1. In this way, the outgoing signal from station 1–*n* is transferred to station 1—1 in time slot *ts*2. As shown in FIG. 2, time slot *ts*1 immediately precedes time slot *ts*2. It is not necessary, however, that these two time slots be adjacent. The two signal transfers are independent and each could occur in any selected time slot of each repetitive cycle.

It should be noted there is no transfer of charge between the storage capacitors of coupling circuits 105–1 and 105–*n*. The signal voltage on a storage capacitor such as 114–*n* in circuit 105–*n* is applied to the storage capacitor of another selected coupling circuit via a high input impedance device such as IGFET 115–1 or amplifier 151 so that the stored signal remains until replaced by a signal transferred through a low impedance coupling device. In this way, a transferred signal is held in the receiving storage capacitor and is available to the coupled station for at least one repetitive time slot cycle. Advantageously, this form of time division signal transfer permits a transfer of signal voltage without a precisely tuned transfer network in one time interval.

Figure 3:
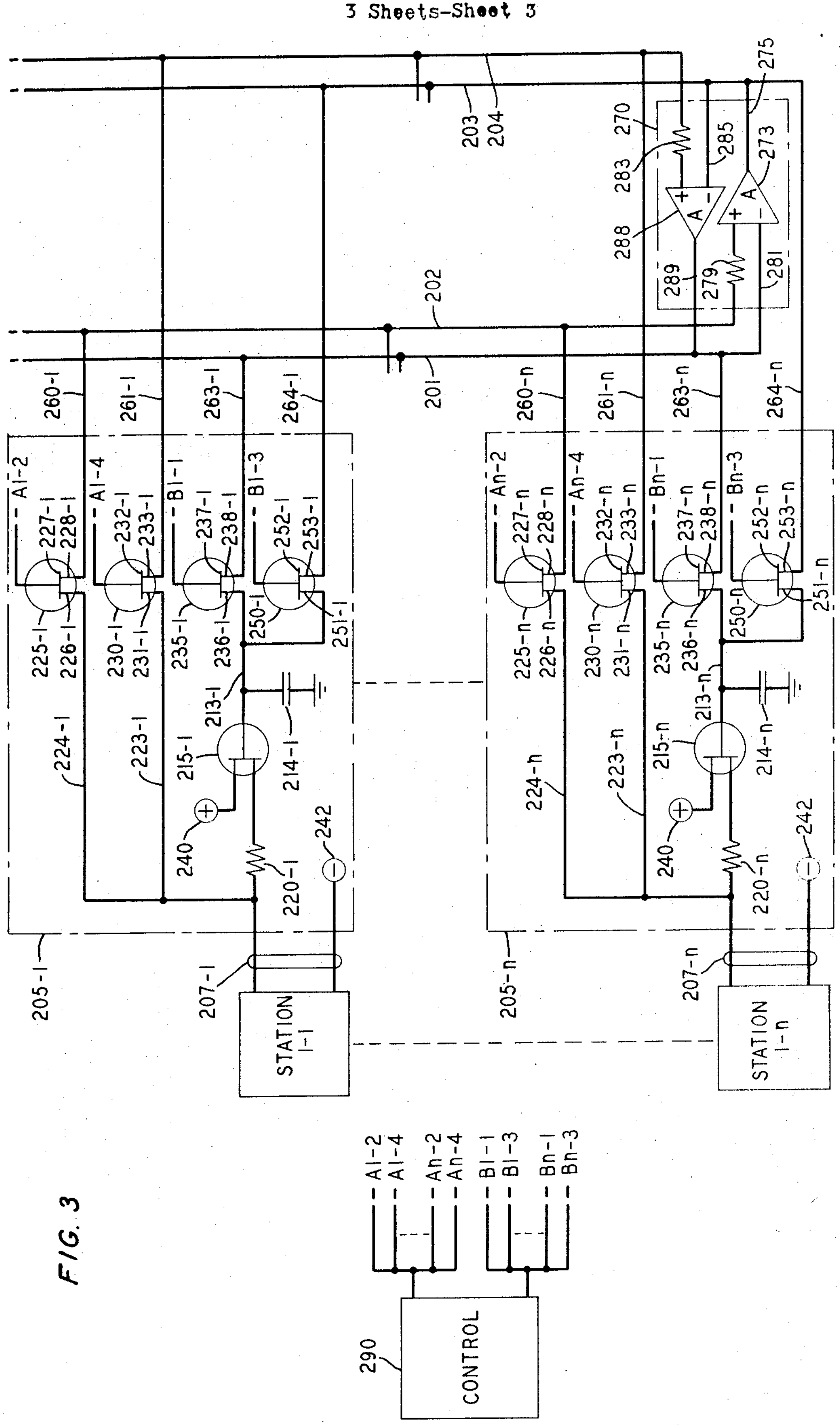
FIG. 3 depicts another embodiment of a time division communication system illustrative of my invention.

FIG. 3 shows a time division communication system including stations 1—1 through 1–*n*, coupling circuits 205–1 through 205–*n*, common buses 201, 202, 203 and 204 and signal transfer circuit 270. The arrangements in FIG. 3 permit the simultaneous signal exchange between a pair of selected stations such as stations 1—1 and 1–*n* in one time interval. The coupling circuit of one station is appropriately connected to one pair of buses, 201 and 202. One amplifier 273 of the signal transfer network 270 provides the cancellation of the coupling circuit storage capacitor signal so that the outgoing signal from the one station is obtained at the amplifier 273 output and is transferred therefrom to the other station storage capacitor via bus 203. In like manner, the other station is connected to the other pair of buses, 203 and 204. The outgoing signal is made available on amplifier 288 and this outgoing signal is transferred to the one station storage capacitor via bus 201. As aforementioned with respect to FIG. 1, each amplifier in the signal transfer network is arranged to provide a d.c. voltage increase to compensate for the d.c. voltage offsets in the source follower circuits of the connected station coupling circuits.

Assume for purposes of illustration that there is a signal exchange between station 1—1 and station 1–*n* in time slot *tsn* shown on FIG. 4. At the beginning of time slot *tsn* (*t*1) control 290 produces control signals A1–2, B1–1, A*n*–4, and B*n*–3. These control signals become positive at *t*1 as illustrated in waveforms 401, 405, 407, and 411, respectively. Control signal A1–2 is applied to gate 227–1 of IGFET switch 225–1 and, as is well known in the art, the positive control signal A1–2 renders the path between source electrode 226–1 and drain electrode 228–1 conductive during time slot *tsn*. It should be noted that in accordance with the principles of operation of *n* type IGFET switches, the control signal applied to the gate electrode must be more positive than the largest positive signal applied to either source or drain electrodes to maintain the IGFET switch conductive. In this way the IGFET switch provides a bidirectional path. Where an IGFET switch is open so that the source-drain path is nonconductive, the control signal applied thereto must be more negative than the largest negative signal appearing on the source or drain electrodes. Control signal B1–1 is applied to gate electrode 237–1 to provide a closed bidirectional path between source electrode 236–1 and drain electrode 238–1. In like manner, control signal A*n*–4 closes IGFET switch 230–*n*, and control signal B*n*–3 closes IGFET switch 250–*n*. Thus, during time slot *tsn*, coupling circuit 205–1 is connected to station 1—1 through line 207–1, to common bus 201 via line 263–1 and to common bus 202 via line 260–1. Coupling circuit 205–*n* is connected to station 1–*n* through line 207–*n* and is further connected to common bus 204 via line 261–*n*, and common bus 203 via line 264–*n*.

In the preceding repetitive time slot cycle, a signal voltage 2*eon* from station 1–*n* was stored in storage capacitor 214–1 in coupling circuit 205–1 and a signal voltage 2*eo*1 from station 1—1 was stored in storage capacitor 214–*n* in coupling circuit 205–*n*. During time slot *tsn*, the signal voltage 2*eon* on storage capacitor 214–1 is applied to common bus 201 via closed IGFET switch 235–1 and line 263–1. The signal voltage on capacitor 214–1 is also applied to the gate electrode of IGFET 215–1. IGFET 215–1 is connected as a source follower amplifier as described with respect to FIG. 1 whereby the signal voltage 2*eon* appears on source electrode 217–1. Impedance 220–1 is selected to match the characteristic impedance of line 207–1 to the output impedance of IGFET 215–1 so that the signal voltage *eon* appears at the junction between impedance 220–1 and line 207–1. Since IGFET switch 225–1 is closed, the signal voltage *eon* and the outgoing signal from station 1—1, i.e., *eo*1, are applied to common bus 202 via lead 224–1, switch 225–1 and line 260–1.

Common bus 202 is connected to the positive input lead of amplifier 273 in signal transfer network 270 via resistor 279; and common bus 201 is connected to the negative input of amplifier 273 via lead 281. Amplifier 273, which may advantageously be of the operational amplifier type, operates to subtract the input on lead 281 from twice the signal applied to resistor 279 whereby the output of amplifier 273 during time slot *tsn* on lead 275 is the signal voltage 2*eo*1.

The signal voltage 2*eo*1 on storage capacitor 214–*n* is applied to common bus 203 via lead 213–*n*, closed IGFET switch 250–*n* and line 264–*n*. Source follower amplifier 215–*n* and matching impedance 220–*n*, as previously described with respect to amplifier 215–1, operate to provide a signal voltage *eo*1 at the junction between impedance 220–*n* and line 207–*n*. This signal voltage and the outgoing signal voltage from station 1–*n* are applied to common bus 204 via lead 223–*n*, closed IGFET switch 230–*n* and line 261–*n*.

Common bus 204 is connected to operational amplifier 288 in signal transfer circuit 270 via resistor 283 and common bus 203 is connected to amplifier 288 via lead 285. Amplifier 288, like amplifier 273, operates to subtract the signal from common bus 203 from twice the signal on common bus 204. Thus the output of amplifier 288 on lead 289 is 2*eon*. It should be noted that the initial value of the signal voltage 2*eo*1 on common bus 203 was obtained during the previous repetitive cycle and the signal voltage 2*eo*1 on lead 275 derived from amplifier 273 is the outgoing signal in the present repetitive cycle from station 1—1. Since the output impedance of amplifier 273 is relatively low, the signal voltage 2*eo*1 from amplifier 273 is applied to lead 285 and to bus 203 in the time interval between times *t*1 and *t*2. In like manner, the output signal 2*eon* from amplifier 288 on lead 289 derived from the outgoing signal on station 1–*n* is applied to lead 281 and to common bus 201 in the interval between times *t*1 and *t*2. Impedances 279 and 283 are selected to provide a proper gain in the amplifier pair including amplifiers 273 and 288 so that an oscillatory condition is prevented.

By time *t*2, the output on lead 289 is signal voltage 2*eon* derived from station 1–*n* in the present time slot and this voltage is transferred via common bus 201, line 263–1, closed IGFET switch 235–1 and lead 213–1 to storage capacitor 214–1. The signal 2*eon* is further coupled through source follower amplifier 215–1 so that the signal voltage *eon* is transferred to station 1—1. In like manner, the output of amplifier 273 signal voltage, 2*eo*1, derived from station 1—1 in the present time slot is applied to common bus 203 and therefrom via line 264–*n*, closed IGFET switch 250–*n*, and lead 113–*n* to capacitor 214–*n*. This signal 2*eo*1 causes the signal *eo*1 to be applied to station 1–n via source follower amplifier 215–n and impedance 220–n. In this way, signals are exchanged between station 1—1 and 1–n in a single time interval.

What is claimed is:

1. A time division communication system wherein a plurality of time slots occurs in repetitive cycles comprising a plurality of lines, first, second and third common buses, each line having means associated therewith for storing a signal incoming to said line received from said third common bus, means for coupling said stored signal from said store to said associated line, and means for coupling said associated line to said second common bus, and means operative in a distinct time slot for transferring a signal outgoing from a first line to a second line comprising means for applying the signal from the storing means associated with said first line to said first common bus, means for applying the sum of the coupled stored signal and the outgoing signal appearing on said first line to said second common bus, means connected to said first common bus and to said second common bus jointly responsive to the stored signal on said first common bus and the sum signal on said second common bus for removing said coupled stored signal from said sum signal, and means for applying the resulting signal corresponding to said first line outgoing signal from said removing means to the storing means associated with said second line via said third common bus.

2. A time division communication system wherein a plurality of time slots occurs in repetitive cycles comprising a plurality of stations; first, second and third common buses; each station having an associated circuit including means for storing a signal incoming to said station from said third common bus and means for coupling said stored signal to said associated station; and means for transferring a signal from a first station to a second station in a distinct time slot comprising first means for connecting said first station storing means to said first common bus, second means for connecting said first station to said second common bus, and third means for connecting said second station storing means to said third common bus, means connected to said first common bus and said second common bus responsive to the signal on said first station circuit storing means appearing on said first common bus and to the sum of the first station coupled stored signal and the signal outgoing from said first station appearing on said second common bus for cancelling said coupled stored signal in said sum signal on said second common bus with said stored signal on said first common bus, and means for applying the resulting signal corresponding to said first station outgoing signal from said cancelling means to said third common bus.

3. A time division communication system wherein a plurality of time slots occurs in repetitive cycles comprising a plurality of stations; first, second and third common buses; each station having an associated circuit including signal storing means and means for coupling said stored signal to said associated station; and means for transferring a signal from a first station to a second station in a distinct time slot comprising first means for connecting said first station storing means to said first common bus, second means for connecting said first station to said second common bus, and third means for connecting said second station storing means to said third common bus, coupling means having a first input connected to said first common bus, a second input connected to said second common bus, and an output connected to said third common bus and comprising means for subtracting the signal on said first input from twice the signal on said second input in said distinct time slot, and means for applying the resultant difference signal to said output.

4. A time division communication system according to claim 3 wherein the means in said associated circuit for coupling the stored signal to the associated station comprises amplifying means and impedance means, said amplifying means including an input connected to said storing means and an output connected to one terminal of said impedance means, the other terminal of said impedance means being connected to said station.

5. A time division communication system according to claim 4 wherein said amplifying means comprises an insulated gate field effect transistor having a source electrode, a drain electrode and a gate electrode, said gate electrode being connected to said storing means, said drain electrode being connected to a voltage source, and said source electrode being connected to said one terminal of said impedance means.

6. A time division communication system according to claim 4 wherein each of said first, second, and third connecting means comprises a semiconductor bidirectional switch having first, second and control electrodes, each switch being responsive to a signal applied to its control electrode for providing a conductive path between its first and second electrodes, the first electrode of said first switch being connected to said first common bus, the second electrode of said first switch being connected to said first station storing means, the first electrode of said second switch being connected to said second common bus and the second electrode of said second switch being connected to said first station, the first electrode of said third switch being connected to said third common bus and the second electrode of said third switch being connected to said second station storing means, and further comprising control means for generating first, second, and third control signals, means for applying said first control signal to said first switch control electrode, means for applying said second control signal to said second switch control electrode, and means for applying said third control signal to said third switch control electrode.

7. A time division communication system according to claim 6 wherein each of said semiconductor bidirectional switches comprises an insulated gate field effect transistor having a source electrode, a drain electrode and a gate electrode, said first electrode being said source electrode, said second electrode being said drain electrode, and said control electrode being said gate electrode.

8. A time division communication system wherein a plurality of time slots occurs in repetitive cycles comprising a plurality of stations; first, second, third and fourth common buses; each station having an associated circuit including signal storing means and means for coupling said stored signal to said associated station; means for transferring a signal from a first station to a second station in a distinct time slot comprising first means for connecting said first station circuit storing means to said first common bus, second means for connecting said first station to said second common bus, and third means for connecting said second station storing means to said third common bus, means connected to said first common bus and said second common bus responsive to the signal appearing on said first common bus and the first station coupled stored signal and the signal outgoing from said first station appearing on said second common bus for producing a signal corresponding to the signal outgoing from said first station, and means for applying the said produced signal to said third common bus; and means for transferring a signal from said second station to said first station in said distinct time slot including fourth means for connecting said second station to said fourth common bus, means connected to said third and fourth common buses responsive to the signal on said second station circuit storing means applied to said third common bus and the second station coupled stored signal and the signal outgoing from said second station applied to said fourth common bus for generating a signal corresponding to the signal outgoing from said second station, and means for applying said generated signal to said first common bus.

9. A time division communication system wherein a plurality of time slots occurs in repetitive cycles comprising a plurality of stations; first, second and third common buses; means for generating first, second and third control signals; each station having an associated coupling circuit comprising storing means, means responsive to said first control signal for connecting said storing means to said first common bus, means for coupling the signal in said storing means to said associated station, means responsive to said second control signal for connecting said associated station to said second common bus, and means responsive to said third control signal for connecting said associated station to said third common bus, and means operative in a distinct time slot for transferring a signal from a first station to a second station comprising means for applying said first and second control signals to said first station coupling circuit, means for applying said third control signal to said second station coupling circuit, and means having a first input connected to said first common bus, a second input connected to said second common bus, and an output connected to said third common bus for subtracting the signal on said first input from twice the signal on said second input and for applying the resultant difference to said output.

10. A time division communication system wherein a plurality of time slots occurs in repetitive cycles comprising a plurality of stations; first, second, third and fourth common buses; means for generating first, second, third and fourth control signals; each station having an associated coupling circuit comprising storing means, means responsive to said first control signal for connecting said storing means to said first common bus, means for coupling the signal in said storing means to said associated station, means responsive to said second control signal for connecting said associated station to said second common bus, means responsive to said third control signal for connecting said associated station storing means to said third common bus, and means responsive to said fourth control signal for connecting said associated station to said fourth common bus; means operative in a distinct time slot for transferring a signal from a first station to a second station comprising means for applying said first and second control signals to said first station coupling circuit, means for applying said third control signal to said second station coupling circuit, means responsive to the signal in said first storing means appearing on said first common bus and to said first station coupled stored signal and the outgoing signal from said first station appearing on said second common bus for producing a signal corresponding to the first station outgoing signal, and means for applying said produced signal to said third common bus; and means for transferring the signal from said second station to said first station in said distinct time slot including means for applying said fourth control signal to said second station coupling circuit, means responsive to the signal in said second station storing means appearing on said third bus and to the second station stored signal and the outgoing signal from said second station appearing on said fourth common bus for generating a signal corresponding to the outgoing signal from said second station, and means for applying said generated signal to said first common bus.

11. A time division communication system according to claim 10 wherein said signal producing means comprises a first operational amplifier having first and second inputs and an output, said first input being coupled to said first common bus, said second input being coupled to said second common bus, and said output being connected to said third common bus, said first operational amplifier being operative to subtract the signal on said first input from twice the signal on said second input and to apply a signal corresponding to the resultant difference to said output, and said signal generating means comprising a second operational amplifier having first and second inputs and an output, the first input of said second amplifier being coupled to said third common bus, the second input of said second amplifier being coupled to said fourth common bus, and the output of said second amplifier being connected to said first common bus, said second amplifier being operative to subtract the signal on the first input of said second amplifier from twice the signal on the second input of said second amplifier and to apply a signal corresponding to the resultant difference to the output of said second amplifier.

* * * * *